(12) United States Patent
Helwegen et al.

(10) Patent No.: US 7,612,947 B2
(45) Date of Patent: Nov. 3, 2009

(54) CONTROLLABLE OPTICAL LENS

(75) Inventors: Ivon F. Helwegen, St. Odilienberg (NL); Stein Kuiper, Vught (NL); Bernardus H. W. Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 177 days.

(21) Appl. No.: 11/575,783

(22) PCT Filed: Sep. 28, 2005

(86) PCT No.: PCT/IB2005/053203

§ 371 (c)(1),
(2), (4) Date: Mar. 22, 2007

(87) PCT Pub. No.: WO2006/035407

PCT Pub. Date: Apr. 6, 2006

(65) Prior Publication Data

US 2008/0062529 A1 Mar. 13, 2008

(30) Foreign Application Priority Data

Sep. 30, 2004 (GB) .................. 0421690.9

(51) Int. Cl.
*G02B 1/06* (2006.01)
*G02B 15/14* (2006.01)
*G02F 1/03* (2006.01)

(52) U.S. Cl. .............. 359/665; 359/698; 359/245; 359/253; 359/900

(58) Field of Classification Search ............. 359/665, 359/666, 696, 697, 698, 721, 820, 823, 245, 359/250, 253, 900
See application file for complete search history.

(56) References Cited

U.S. PATENT DOCUMENTS

| 7,245,439 | B2 * | 7/2007 | Kuiper et al. ............ 359/665 |
| 2002/0176148 | A1 | 11/2002 | Onuki et al. | |
| 2005/0041301 | A1 * | 2/2005 | Kibayashi ............ 359/666 |

FOREIGN PATENT DOCUMENTS

| WO | 03069380 | 8/2003 |
| WO | 2004077126 | 9/2004 |

* cited by examiner

*Primary Examiner*—Jack Dinh

(57) ABSTRACT

A controllable electrowetting lens system has a feedback control loop for controlling the electrode arrangement drive signals to implement an autofocus function. The feedback control loop comprising an image analysis focus detection system and a variable gain element. The gain is adjusted based on the lens condition, for example as sensed by a capacitance sensing arrangement. The autofocus control loop can be optimized to the lens characteristics (because the lens characteristics change over time) and/or to external conditions such as temperature.

18 Claims, 3 Drawing Sheets

CONTROLLABLE OPTICAL LENS

This invention relates to a controllable optical lens, in particular using the so-called electrowetting principle (also known as electrocapillarity).

An electrowetting lens comprises a chamber housing two non-miscible liquids, such as an electrically insulating oil and a water based conducting salt solution, and the meniscus between these fluids defines a refractive index boundary and therefore performs a lens function. The shape of the meniscus is electrically controllable to vary the power of the lens. The fluid may comprise a liquid, vapour, gas, plasma or a mixture thereof.

The electrical control of the lens shape is achieved using an outer annular control electrode, and the electrowetting effect is used to control the contact angle of the meniscus at the outside edge of the chamber, thereby changing the meniscus shape.

The basic design and operation of an electrowetting lens will be well known to those skilled in the art. By way of example, reference is made to WO 03/069380.

Electrowetting lenses are compact and can provide a variable focusing function without any mechanical moving parts. They have been proposed in various applications, particularly where there are space limitations and where power consumption is to be kept to a minimum, for example use as an autofocus camera lens in a mobile phone.

It has been recognised that sensing the lens condition is desirable, to provide a feedback control function. Due to slow charging of the insulators (between the electrodes and the fluids) the relation between the voltage and the exact position of the oil-water meniscus is subject to drift, and a feedback system can compensate for this. A conventional electrowetting lens has a bottom electrode and a circumferential wall electrode. It has been proposed that the capacitance across the electrodes can be measured to provide feedback about the shape of the lens. In particular, the shape and the position of the meniscus changes when a voltage is applied, so that the effective size of the annular electrode changes (the effective size depends on the area of water in contact with the electrode, which changes as the meniscus position changes). A resulting change in capacitance can be measured, and this capacitance has been considered to be a reasonably accurate parameter for measuring the strength of the lens.

Sensing the lens conditions in this way can be used to maintain a constant focal depth over time.

Electrowetting lenses are also good candidates for use as autofocus camera lenses, for example in mobile phones. An advantage of the electrowetting lens over conventional autofocus lenses is a high focusing speed. It is typically possible to change focus from an object at 5 m towards an object at 30 cm within 10 ms. An autofocus (AF) algorithm ensures that the system stays in correct focus when a focus point is changed. The autofocus algorithm searches for sharp edges, and these are manifested as high frequency changes in image content.

The use of the autofocus algorithm in a feedback control loop enables the focus control to take account of all factors influencing the lens performance. However, this feedback control loop may be slow to respond or may be instable, depending on the lens conditions.

According to the invention, there is provided a controllable optical lens system, comprising:

a lens comprising:

a chamber housing first and second fluids, the interface between the fluids defining a lens surface; and an electrode arrangement for electrically controlling the shape of the lens surface;

a feedback control loop for controlling the electrode arrangement drive signals to implement an autofocus function, the feedback control loop comprising an image analysis focus detection system and a variable gain element;

a sensor arrangement for detecting a condition of the lens and/or an environmental condition; and a gain adjustment unit for controlling the variable gain element based on the sensor arrangement output.

In this system, an autofocus function is implemented using image analysis. However a gain in the control loop takes account of the lens conditions or an environmental conditions. This means the control loop can be optimised to the lens characteristics (because the lens characteristics change over time) and/or to external conditions such as temperature.

The sensor arrangement can comprise a capacitance sensing arrangement for measuring a capacitance between first and second electrodes of the electrode arrangement. It has been recognised that this capacitance measurement can provide an indication of the shape of the lens.

The variable gain element is preferably for amplifying a signal based on an error signal provided by the focus detection system.

The sensor arrangement can be for determining the response of the lens to at least first and second lens drive conditions, the gain adjustment unit deriving a desired gain value from the lens response. These first and second drive conditions can be the extreme voltage drive conditions. For example, the lens drive conditions may comprise relative voltages between the first and second electrodes, and the sensor arrangement can measure the capacitance between the electrodes. The desired gain value is then proportional to the ratio of the voltage difference between the two relative voltages for the at least first and second lens drive conditions and the capacitance difference between the corresponding two capacitances. This effectively assumes a linear response of the lens between extreme drive conditions, and the slope of this response then determines the gain that is appropriate in the feedback control loop.

The invention also provides a method of driving a controllable optical lens, the lens comprising a chamber housing first and second fluids, the interface between the fluids defining a lens surface and an electrode arrangement for electrically controlling the shape of the lens surface, wherein the method comprises controlling the electrode arrangement drive signals to implement an autofocus function by:

performing a focus detection operation using image analysis;

detecting a condition of the lens and/or an environmental condition; and implementing a feedback control loop with variable gain using the focus detection signal, and wherein the variable gain is controlled based on the detected lens condition and/or environmental condition.

Examples of the invention will now be described in detail with reference to the accompanying drawings, in which.

Figure 1:
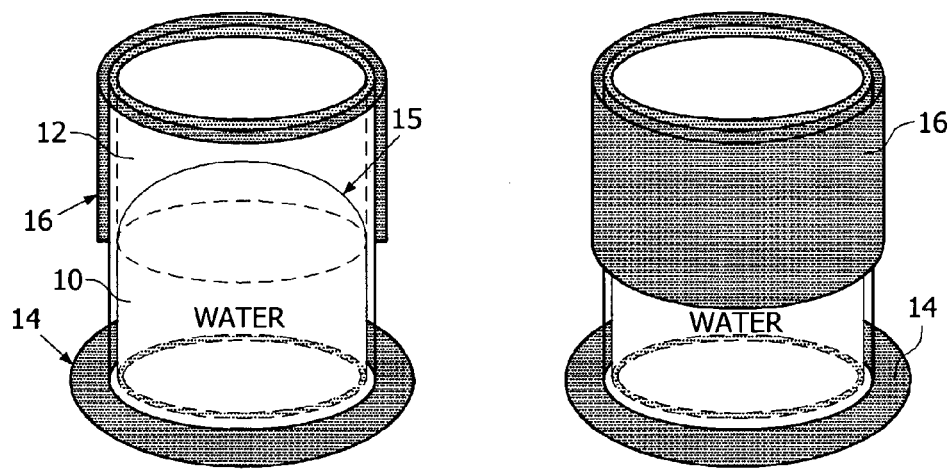
FIG. 1 shows a known design of electrowetting lens.
Figure 2:
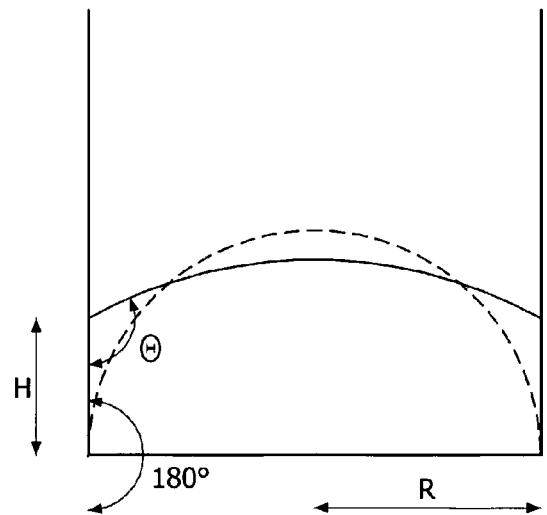
FIG. 2 shows parameters of the lens to help explain the operation of the lens.

FIG. 1 schematically shows a known electrowetting lens design, and FIG. 2 shows parameters which define the lens shape.

The left part of FIG. 1 shows the interior of the lens. The lens comprises a chamber which houses a polar and/or conductive liquid such as a salted water based component 10 (referred to below simply as the water) and a nonconductive liquid such as an oil based component 12 (referred to below simply as the oil). A bottom electrode 14 and a circumferential side electrode 16 control the power of the lens. The side electrode is separated from the liquid by an insulator which forms the side wall of the chamber, and this insulator acts as a capacitor dielectric layer during electrical operation of the lens. This operation will be well known to those skilled in the art, and reference is made to WO 03/069380.

The optical power of an electrowetting lens is determined by the radius of the meniscus formed at the interface of the two liquids. The radius can be derived from the contact angle θ (shown in FIG. 2) of the meniscus at the wall. For the case than the contact angle is less than 180 degrees in the off state, this contact angle is governed by the relation:

$$\gamma_{ci}\cos\theta = \gamma_{wc} - \gamma_{wi} + \frac{1}{2}\frac{\varepsilon_0\varepsilon_r}{d}V^2, \quad (1)$$

where θ is the angle the meniscus makes with the wall, V the voltage applied, $\gamma_{ci}$ is the water/oil surface tension, $\gamma_{wc}$ is the wall/water surface tension and $\gamma_{wi}$ is the wall/oil surface tension, $\varepsilon_r$ the permeability of the insulating layer (the chamber wall) and d its thickness. As a result, the radius of the meniscus is directly related to the voltage applied, and the lens is thus a voltage controlled device.

However, the radius also depends on various other parameters such as the surface tension values, which are not necessarily constant over time or temperature. Contamination of the liquids in time, for example due to dissolution of substances from the housing, may alter these values, which will then alter the relation between V and the radius of the meniscus. Furthermore, charging of the insulating layer in time may occur, which changes the term V in Equation (1) into a term $(V-V_0)$. This effect also affects the relation between meniscus radius and voltage.

The values $\varepsilon_r$ and d are expected to remain significantly constant in time. Therefore, a measurement of the meniscus dependent on these parameters, and independent of the voltage, is expected to be more stable in time.

It has been recognised that measurement of capacitance can be used to provide a feedback function. As the volume of both liquids remains the same and as the interface is spherical, the position of the meniscus at the wall and the radius are directly related. By measuring the position of this interception, the power of the electrowetting lens is known. The relation with the position of the meniscus and the capacitance C of the electrowetting lens is given by:

$$C = \frac{\varepsilon_0\varepsilon_r}{d}A \quad (2)$$

where A is the area of the electrode with the insulator layer of thickness d and permeability $\varepsilon_r$ covered by the conducting liquid (the water). Essentially, the size of one of the capacitor electrodes is dependent on the contact height of the water, and the size of the capacitor electrode determines the capacitance.

It has been proposed to use this capacitance to enable a constant focus depth to be maintained.

It has been recognised that electrowetting lenses can also be used in autofocus applications.

Figure 3:
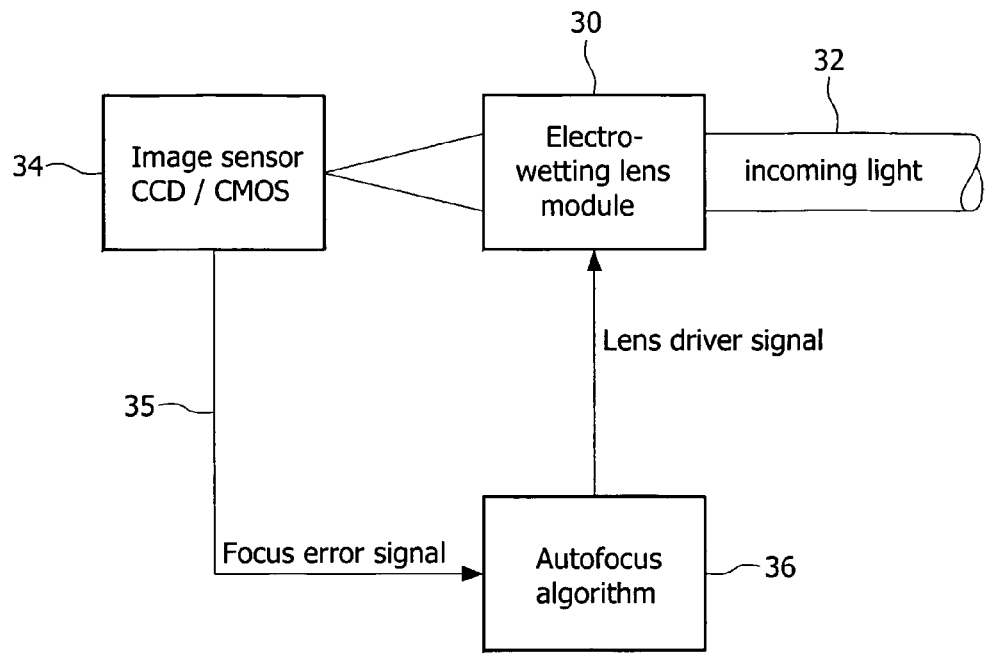
FIG. 3 shows a known autofocus camera using an electrowetting lens.

FIG. 3 shows a block diagram of a known autofocus electrowetting lens camera.

The camera comprises a lens module 30 which receives incoming light and focuses the image onto an image sensor 34 in the form of a CCD or image sensor array.

The electrowetting lens module 30 contains a number of conventional lenses in addition to the electrowetting lens, and a driver to generate the high voltage signals to focus an image at a specific distance.

The image sensor 34 senses the incoming light and converts it to an electrical signal that can be stored in a memory. It also generates an error signal 35 (that can for example be obtained from the high-frequency image information) that represents the focus error at a specific moment. The image sensor thus includes a focus detection system, although this may of course be implemented as a separate part of the system.

An autofocus algorithm 36 implements a control loop that converts the focus-error-signal 35 into a lens driver signal to drive the lens.

The autofocus feedback control loop ensures the correct focus for all operating conditions of the lens. However, these operating conditions may affect the stability and/or the response time of the feedback control loop.

Normally, when a specific voltage is applied to the lens, the lens will change its meniscus shape, which results in a specific focus distance. A specific gain can thus be set for the feedback loop to maintain stability and to have a bandwidth that is high enough to have a reasonable autofocus time.

Because of aging, some of the lens materials (e.g. coatings, housing, o-rings, plastic lenses) may partly dissolve in the oil and water. This results in a change in surface tension of the liquids and consequently a change in driver voltage is needed for a specific focus distance.

In practice, the driver voltage for a specific focus distance becomes lower and the gain of the lens increases. When nothing is done, the total system gain increases and the feedback system may become unstable. In accordance with the invention, the feedback gain can be decreased to keep the system stable.

Alternatively, when the gain of the lens decreases, for example due to higher surface tensions when the ambient temperature is low, the total gain and also the bandwidth of the system decreases and it takes more time to focus the lens. In this case, the invention enables the feedback gain to be increased to obtain higher bandwidth.

The invention thus provides a feedback control loop for controlling the lens to implement an autofocus function, in which the feedback control loop uses image analysis but also has a variable gain element. This is controlled in dependence on a sensor arrangement which detects a condition of the lens and/or an environmental condition.

In particular, the system of the invention calibrates the focus gain periodically by measuring the capacitance at specific voltages. The feedback gain can then be adapted to overcome aging problems and/or temperature effects (or other external conditions).

Figure 4:
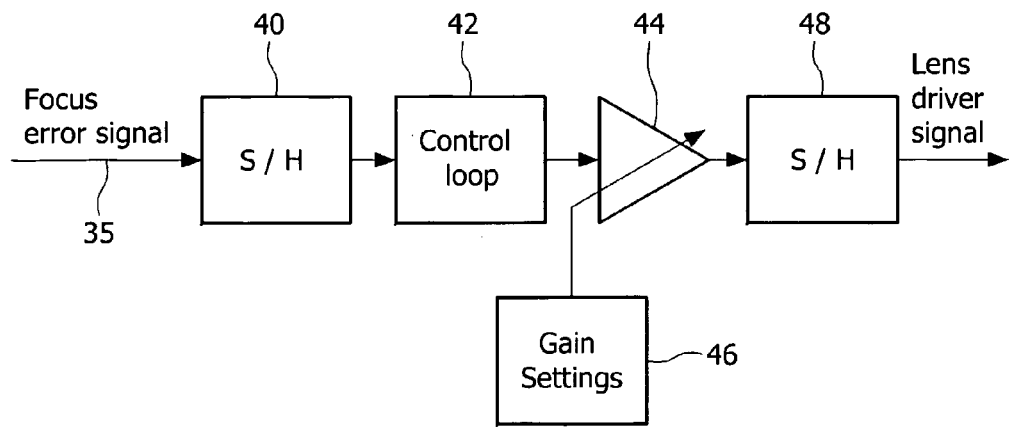
FIG. 4 shows a control loop in accordance with the invention for use in a system having an electrowetting lens.

FIG. 4 shows a block diagram of a control loop with variable gain for the electrowetting lens in accordance with the invention. The components shown in Figure supplement the autofocus algorithm in FIG. 3.

The error-signal from the image sensor is sampled by sample and hold element 40 and fed through a control loop 42. This control loop implements the autofocus algorithm.

The signal is then amplified by amplifier 44 which has an adjustable gain dependent on the gain settings provided by unit 46, and the amplified output is sampled by unit 48 and provided to the output. The output signal is fed to the electrowetting lens via a driver as in the example of FIG. 3.

The gain settings essentially maintain stability and bandwidth of the autofocus control system as the lens characteristics change. The determination of the gain settings thus involves measuring the lens characteristics (and/or temperature). As mentioned above, capacitance measurement provides one way of determining the lens conditions.

Figure 5:
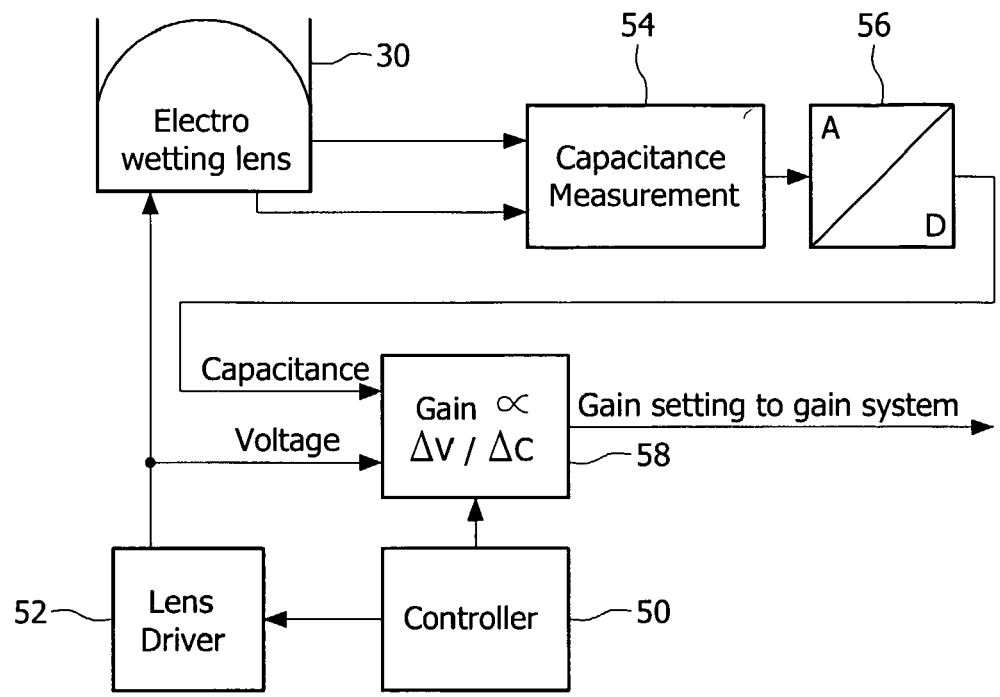
FIG. 5 shows how the gain values for operating the control loop of FIG. 4 are determined.

FIG. 5 shows a block diagram of the system for controlling the calibration of the variable gain element, by determining the gain settings.

A controller 50 implements a periodic calibration, for example. when the camera is switched on, every hour, or every week. The calibration is implemented as follows:

The controller 50 sends a voltage (e.g. 0V) to the lens 30 by means of the lens driver 52, and the capacitance is measured by capacitance measurement unit 54 and converted to digital form by A/D converter 56. The voltage and capacitance values are stored in a memory (not shown).

The controller then sends another voltage (e.g. Vmax=100V) to the lens and the capacitance is measured again. These values are also stored in a memory.

A gain calculation unit 58 calculates the gain from the values that are stored in the memory. If the gain value needs to be saved when the device is switched off, it can be stored in non-volatile memory. Otherwise, volatile memory is sufficient.

The gain value can be calculated as follows:

$$\text{Gain} = K \cdot \frac{\Delta V}{\Delta C} \propto \frac{\Delta V}{\Delta C}$$

Thus, the gain that is needed is proportional to the voltage difference between the two points divided by the capacitance difference between the two points. The constant factor K is dependent on the driver gain, focus loop gain, etc. This factor K needs to be chosen in such a way that the system always obtains the desired bandwidth and never becomes unstable.

Figure 6:
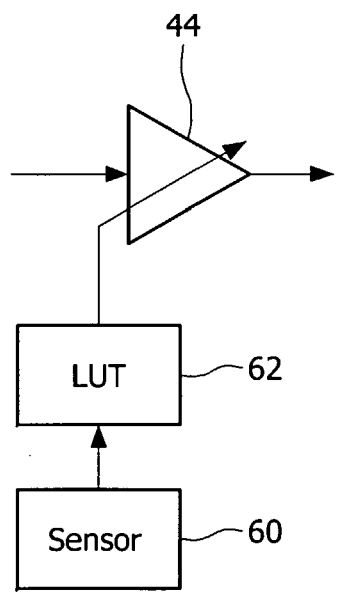
FIG. 6 shows how gain can be controlled in dependence on temperature.

Temperature dependent gain can be compensated by measuring temperature and correcting for, for example using a look up table. FIG. 6 shows a temperature sensor 60 used to address a look up table 62 which also controls the variable gain element 44.

In the simple scheme described above, the gain calibration is based on a constant gain for the complete range, and two drive voltages at the extremes of the drive voltage control range are used to determine the gain. In fact, any two points over the complete focus range can be measured and from these points the same gain can be determined, assuming a linear function.

However, when the system is not linear, the gain can be measured over the complete voltage range and a non-linear gain curve can be stored in memory.

In the example described above, a simple capacitance measurement between two electrodes is used to determine the lens response at different drive voltages. Many other types of sensing may be used to determine the lens condition. Furthermore, the lens may comprise a more complicated electrode arrangement than the simple base and annular electrodes as in the example above.

The gain element can simply introduce a simple mulitplicative gain which is constant for all input values, but more complicated processing may be carried out by the variable gain element. As mentioned above, it may implement a non-linear function.

Rather than being restricted to the examples above, the invention more generally provides a system in which an autofocus feedback control loop is adapted to take account of lens characteristics which may vary over time.

The invention can be applied to the use of electrowetting lenses in cameras, for example for mobile telephones. Other uses of electrowetting lenses will however be apparent to those skilled in the art, such as in production lines or other object processing operations, where image analysis or image projection is required.

Various modifications will be apparent to those skilled in the art.

The invention claimed is:

1. A controllable optical lens system, comprising:
   a lens (30) comprising:
      a chamber housing first and second fluids (10,12), the interface between the fluids defining a lens surface (15); and
      an electrode arrangement (14,16) for electrically controlling the shape of the lens surface;
      a sensor arrangement (34) for detecting a condition of the lens and/or an environmental condition and for generating a focus error signal (35) that represents a focus error of the lens at a specific moment in time;
      an autofocus control feedback loop (42) for converting the focus error signal (35) output from the sensor arrangement (34) into an electrode arrangement drive signal to optimize lens characteristics by taking account of changes in said lens characteristics over time and to changes in external conditions over time, the feedback control loop implementing an autofocus function (36) for ensuring the correct lens focus for all operating conditions of the lens;
      a variable gain element (44) outputting the lens driver signal; and
      a gain adjustment unit (46) for controlling the variable gain element (44) based on the sensor arrangement (34) output.

2. A system as claimed in claim 1, wherein the sensor arrangement comprises a capacitance sensing arrangement for measuring a capacitance between first and second electrodes (14,16) of the electrode arrangement.

3. A system as claimed in claim 1, wherein the sensor arrangement comprises a temperature sensor (60).

4. A system as claimed in claim 3, wherein the feedback control loop comprises a look-up table (62) addressed by the measured temperature.

5. A system as claimed in claim 1, wherein the variable gain element (44) is for amplifying a signal based on an error signal (35) provided by the focus detection system (34).

6. A system as claimed in claim 1, wherein the output of the variable gain element (44) is provided to a driver circuit for providing the electrode drive signals.

7. A system as claimed in claim 1, wherein the sensor arrangement is for determining a response of the lens to at least first and second lens drive conditions, the gain adjustment unit deriving a desired gain value from the lens response.

8. A system as claimed in claim 7, wherein the lens drive conditions comprise relative voltages between the first and second electrodes (14,16), and the sensor arrangement measures a capacitance between the electrodes, and wherein the desired gain value is proportional to the ratio of the voltage difference ($\Delta V$) between the two relative voltages for the at least first and second lens drive conditions and the capacitance difference ($\Delta C$) between the corresponding two capacitances.

9. A system as claimed in claim 1, wherein the electrode arrangement comprises a drive electrode arrangement comprising a base electrode (14) and a side wall electrode (16).

10. A system as claimed in claim 9, wherein the side wall electrode (16) comprises an annular electrode which surrounds the chamber.

11. A system as claimed in claim 1, wherein the first fluid comprises a polar and/or conductive liquid and the second fluid comprises a nonconductive liquid, hat converts the focus-error-signal 35 into a lens driver signal to drive the lens.

12. A method of driving a controllable optical lens, the lens comprising a chamber housing first and second fluids (14,16), the interface between the fluids defining a lens surface (15) and an electrode arrangement (14,16) for electrically controlling the shape of the lens surface, wherein the method comprises controlling the electrode arrangement drive signals to implement an autofocus function by:
performing a focus detection operation using image analysis;
detecting a condition of the lens and/or an environmental condition; and
implementing a feedback control loop for converting a focus-error signal into a lens driver signal to drive the controllable optical lens, the feedback control loop having wherein the variable gain is controlled based on the detected lens condition and/or environmental condition, wherein the step of implementing the feedback control loop comprises:
sampling the focus-error-signal output from an image sensor;
feeding the focus-error signal through a control loop which implements an autofocus algorithm for converting the focus-error signal into the lens driver signal to drive the controllable optical lens.

13. A method as claimed in claim 12, wherein detecting a condition of the lens and/or an environmental condition comprises measuring a capacitance between first and second electrodes of the electrode arrangement (14,16).

14. A method as claimed in claim 12, wherein detecting a condition of the lens and/or an environmental condition comprises measuring temperature.

15. A system as claimed in claim 12, wherein controlling the variable gain comprises amplifying a signal derived from an error signal provided from the focus detection operation.

16. A method as claimed in claim 12, wherein the method further comprises determining a response of the lens to at least first and second lens drive conditions, and wherein a desired gain value is derived from the lens response.

17. A method as claimed in claim 16, wherein determining the response of the lens to at least first and second lens drive conditions comprises determining a capacitance between first and second electrodes for different relative voltages between the first and second electrodes.

18. A method as claimed in claim 17, wherein controlling the variable gain comprises determining a desired gain value which is proportional to the ratio of the voltage difference ($\Delta V$) between the two relative voltages for the at least first and second lens drive conditions and the capacitance difference ($\Delta C$) between the corresponding two capacitances.

* * * * *